United States Patent [19]
Mayer

[11] Patent Number: 5,513,288
[45] Date of Patent: Apr. 30, 1996

[54] OPTICAL POLYMER ELEMENT FOR COUPLING PHOTOELEMENTS ONTO INTEGRATED-OPTICAL CIRCUITS

[75] Inventor: Klaus-Michael Mayer, Gerlingen, Germany

[73] Assignee: Robert Bosch GmbH, Stuttgart, Germany

[21] Appl. No.: 347,488

[22] PCT Filed: Jun. 3, 1993

[86] PCT No.: PCT/DE93/00475

§ 371 Date: Dec. 6, 1994

§ 102(e) Date: Dec. 6, 1994

[87] PCT Pub. No.: WO93/25924

PCT Pub. Date: Dec. 23, 1993

[30] Foreign Application Priority Data

Jun. 15, 1992 [DE] Germany ............... 42 20 135.7

[51] Int. Cl.⁶ .................................................. G02B 6/26
[52] U.S. Cl. ..................... 385/30; 385/14; 385/15; 385/27; 385/43; 385/88; 385/89; 385/129; 385/130; 385/131
[58] Field of Search ....................... 385/14, 15, 27, 385/31, 39, 43, 49, 50, 88, 89, 92, 94, 129, 130, 131, 132

[56] References Cited

U.S. PATENT DOCUMENTS

| | | | |
|---|---|---|---|
| 4,666,236 | 5/1987 | Mikami et al. | 385/49 X |
| 4,897,711 | 1/1990 | Blonder et al. | 385/88 X |
| 5,119,452 | 6/1992 | Yokomori et al. | 385/36 |
| 5,170,448 | 12/1992 | Ackley et al. | 385/31 |
| 5,193,131 | 3/1993 | Bruno | 385/14 |
| 5,230,030 | 7/1993 | Hartman et al. | 385/50 |
| 5,265,184 | 11/1993 | Lebby et al. | 385/132 |
| 5,390,275 | 2/1995 | Lebby et al. | 385/132 |

FOREIGN PATENT DOCUMENTS

| | | | |
|---|---|---|---|
| 0415382A2 | 3/1991 | European Pat. Off. | 385/49 X |
| 2226754 | 11/1974 | France | 385/49 X |
| 2168206 | 9/1990 | Japan | 385/43 X |

OTHER PUBLICATIONS

R. J. Deri et al., "Impedance matching for enhanced waveguide/photodetector integration", *Applied Physics Letters*, vol. 55, No. 26, Dec. 25, 1989, pp. 2712–2714.

L. A. Hornak et al., "The Impact of Polymer Integrated Optics on Silicon Water Area Networks", *Nonlinear Optical Properties of Organic Materials III*, SPIE vol. 1337, 1990, pp. 12–22. (No Month).

Toshihiko Baba et al., "High efficiency light coupling anti-resonant . . . ", *Applied Optics*, vol. 29, No. 18, Jun. 20, 1990, pp. 2781–2791.

Gary Mak et al., "Waveguide–detector couplers for integrated optics . . .", *Applied Optics*, vol. 28, No. 21, Nov. 1, 1989 pp. 4629–4636.

R. J. Deri et al., "Integrated waveguide/photodiodes using vertical impedance matching", *Applied Physics Letters*, vol. 56, No. 18, Apr. 30, 1990, pp. 1737–1739.

*Primary Examiner*—Brian Healy
*Attorney, Agent, or Firm*—Spencer & Frank

[57] ABSTRACT

An integrated-optical device in polymer technology, having a photoelement coupled onto an optical waveguide, with only the evanescent field components of the optical waveguide being coupled by an optical coupling element into the photoelement, wherein the photoelement (23) is incorporated into a polymeric upwardly closed cover plate (51), the cover plate (51) is fitted exactly onto a base plate (50) having an optical waveguide (20), and the coupling element is an optical buffer layer (54) disposed between the cover plate (51) and base plate (50). Preferably, the buffer layer (30) has a refractive index in the region opposite the photoelement (23) which is less than or equal to the refractive index of the optical waveguide (20), but greater than the refractive index of the buffer laser (30) outside the region opposite the photoelement (23).

29 Claims, 8 Drawing Sheets

Fig. 1
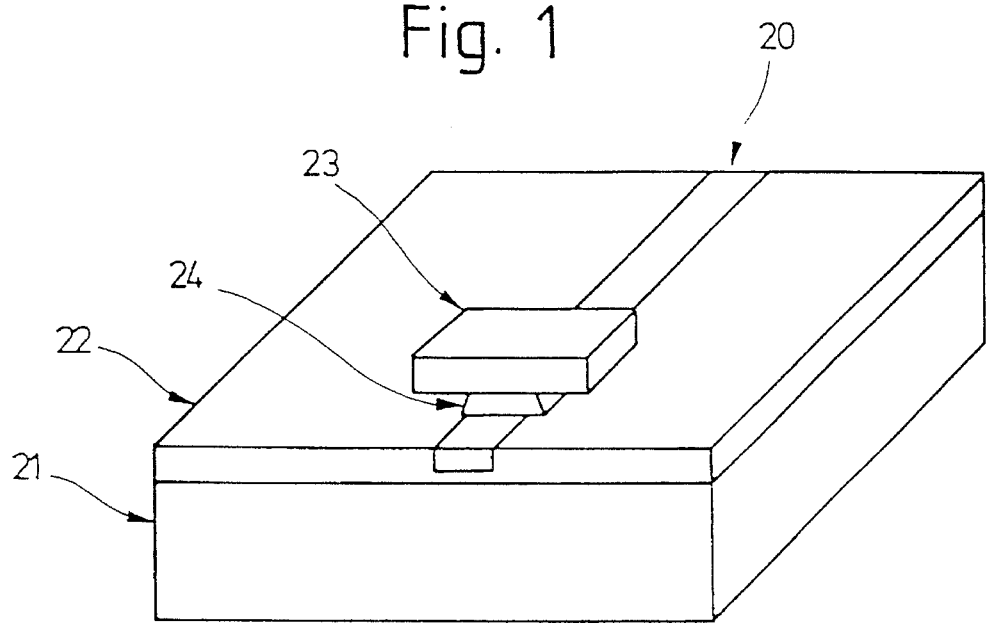
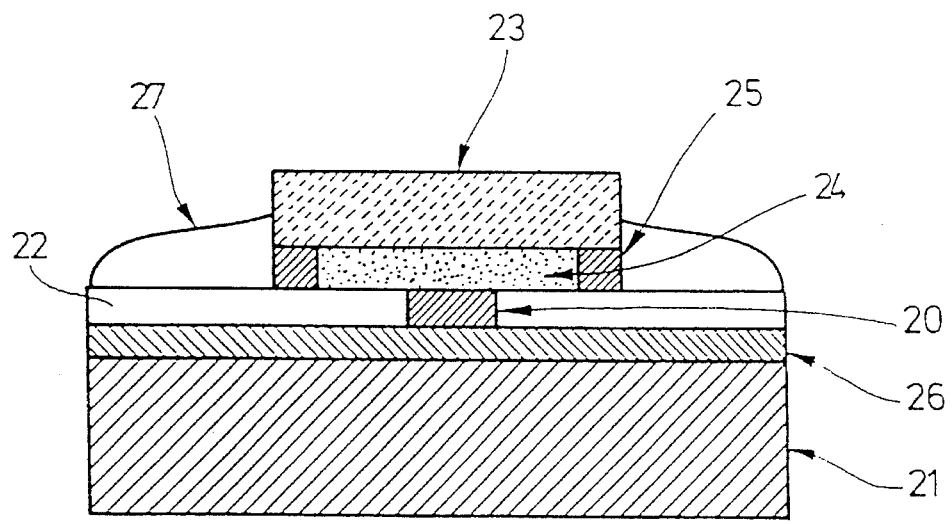
Fig. 2

OPTICAL POLYMER ELEMENT FOR COUPLING PHOTOELEMENTS ONTO INTEGRATED-OPTICAL CIRCUITS

The invention relates to an optical polymer element according to the pre-characterizing clause of the main claim and is preferably used in the coupling of suitable photodiodes onto devices of integrated optics.

The increasing use of integrated-optical components for optical communications, for sensor technology and the computer field lends ever greater significance to the optical connection technique.

Devices of integrated optics (IO) for optical communications (wavelength range 1300 to 1550 nm) and for optical sensor technology (usually in the wavelength range of 633–850 nm) require an optoelectronic signal conversion at the interface between optical and electronic signal processing. This takes place, for example, by coupling the signal light into a photodiode of corresponding spectral sensitivity (for example, InP compounds for optical communications, Si photodiodes for sensor technology).

The usual way of coupling a photodiode onto an optical waveguide consists in a direct coupling of the photodiode onto the waveguide end ("butt coupling"). The light-energy is in this case guided completely into the diode and is transformed there into states of electronic excitation. In addition, an optical waveguide can also be coupled weakly to a photodiode, by only its evanescent field components transferring into the diode ("leaky wave coupling")— the magnitude of the electronic signal response is in this case a function of coupling strength and coupling length. Alternatively, furthermore, an optical waveguide can be passed through an optical semiconductor amplifier (essentially a semiconductor laser diode with antireflection-coated end faces) and the decrease in the charge carrier inversion can be picked off as an electronic signal via the external power supply of the amplifier diode.

The known devices have the disadvantage that they can only be produced in a relatively complex manner.

SUMMARY AND ADVANTAGES OF THE INVENTION

The optical polymer element according to the invention offers in comparison with the known devices, the coupling and fastening of photoelements onto integrated-optical polymeric waveguides is possible, the polymer element is compatible with planar-integrated electronics and great cost advantages are achieved by mass production.

For this purpose, a coupling element, preferably a buffer layer, is provided between the optical waveguide and the photoelement, the buffer layer having, in the region of the photoelement, a refractive index which is less than or equal to the refractive index of the optical waveguide, but is greater than the refractive index of the buffer layer outside the region of the photoelement.

Further advantageous developments are specified in the sub-claims.

A preferred solution is if the photodiodes are integrated by planar and monolithic techniques directly into suitable substrates (for example silicon) by diffusing processes and/or ion implantation. The electrical wiring is advantageously performed directly on the chip. To apply optical waveguides onto a chip electronically processed in this way, first of all an optical buffer layer of lower refractive index than the light-guiding layer is applied. This is followed by the light-guiding polymer layer with the laterally structured optical waveguides and, optionally thereover, an upper covering layer of lower refractive index. If the buffer layer is optically thin (thickness<1/e drop of the field distribution), the evanescent field components extend into the substrate and result in strong intensity losses. If, conversely, the buffer layer is optically thick (thickness>>1/e drop of the field distribution), even in the region of the photodiode there is no light coupled in to the latter.

The necessary high and local coupling of the optical waveguide onto the photodiode is thus achieved by virtue of the fact that the "optically insulating" buffer layer can be optically changed locally over the sensitive window of the photodiode in such a way that the evanescent fields can extend locally far beyond the buffer layer (and into the photodiode). For this purpose, the buffer layer can be masked in such a way that a local ion diffusion or ion implantation raises only the refractive index in a desired window over the photodiode. The masking is removed after the process and the optical-waveguide and covering layer applied. The degree of coupling of the optical waveguide can be set by means of the index change in the buffer layer.

An advantageous possibility for realization is offered by a polymer layer (for example PMMA as the optical buffer) with photopolymerizable additives (for example benzil dimethyl ketal). Here, the refractive index of the buffer layer can be raised locally over the photodiode by simple UV exposure with the masking technique. By UV exposure of structures of varied density (neutral wedge), the index can additionally also be gradually changed spatially, if index jumps and possibly resulting disturbances of the single-mode emission of the waveguide are to be avoided. Depending on the photopolymerization behaviour of the optical buffer, in this case either an index profile of the buffer in the longitudinal direction of the waveguide can be produced (i.e. slightly increased refractive index at the edges of the photodiode, more increased index over the detection window of the diode) or a spatial depth profile of the index increase in the buffer layer (i.e. superficial index increase at the diode edges, deeper-extending index increase over the detection window of the diode=>"a vertical taper") can be produced.

In both limiting cases (combinations are possible), the slightly raised refractive index over the photodiode effects there a weaker guidance of the light, synonymous with a broadened field distribution in the direction of the diode. By adiabatic index changes (for example neutral wedge exposures), in this case the disturbance of the guiding properties is kept sufficiently small in order to preserve the single-mode emission of the waveguide—this is important if the signal is to be looped past the photodiode (and merely attenuated by the detection) or if the signal is to be coupled wavelength-selectively into optical resonators, without massively influencing the mode distribution in the resonator.

The buffer layer can itself, in addition, also be laterally photostructured, by a taper structure running to a point and having a slightly increased index being exposed into it. In this case also, the light field of a waveguide lying thereover is expanded gradually (by adiabatic activating of the disturbance) downwards in the direction of the diode by the index manipulation of the buffer layer. If the refractive index of the buffer layer in the tapered region is even set higher than that of the optical waveguide lying thereover, the light field is drawn completely out of the waveguide and fed to the diode.

Following the index manipulation of the buffer layer, as described above, the optical waveguide is structured in the layer lying thereover. What is important here is the possibility in principle of providing any preprocessed and wired electronic chips subsequently with a polymeric "optical connection level" over it, which can be performed without disturbance of the electronic devices on account of the low process temperatures necessary for the production of polymeric optical waveguides.

According to the invention, it is furthermore advantageous if optical waveguides are predefined in the form of small, precision-made grooves on a "master structure" and are further processed by an electroforming technique for use as a mould (tool) for injection-moulding or injection-compression moulding processes. Consequently, a mass-producible duplication of optical waveguide devices becomes possible. The small grooves in the embossed "daughter structures" (polymer substrates) are filled with higher-refractive-index optical polymer for the production of a solid-polymer device (channel waveguide) and are closed at the top by a polymeric (lower-refractive-index) cover plate (superstrate). The cover plate may, for example, consist of the same material as the waveguide daughter structures and then define a passive device. The cover plate may, however, also carry electronic devices used in hybrid form (for example photodiodes), which can then be optically coupled onto the optical waveguides. For this purpose, a suitable master structure with receiving openings for the electronic devices is produced for the cover plate. This can be performed by anisotropic precision etching of receiving depressions in silicon wafers or else by so-called X-ray gravure lithography in PMMA materials. The covering structures can be electro-formed from this like the optical waveguides and duplicated in injection-moulding/injection-compression moulding processes.

The photodiodes (and, if appropriate, further devices) are inserted individually (or preferably as a detector array) into the depressions of the cover plate and fastened. Before the exact fitting together of the thus-prepared cover plate and the base plate with the optical waveguides (in the form of small grooves with filled, higher-refractive-index liquid polymer), there must be incorporated between the optical waveguides and the electronics in the cover plate an optical buffer layer, which allows an optical coupling via the evanescent field components only in the region of the diode entry windows.

Two advantageous ways are appropriate for this:

a) The electrical wiring of the electronics is performed by depositing corresponding conductor tracks on the equipped cover plate. A polymer layer (index as cover plate) with photopolymerizable admixtures is applied thereover as the optical buffer. By local UV exposure (masking technique), the index can be set in the region of the photodiode, as described above, with or without taper structures in such a way that the light coupling is possible here—and only here— in the ready-assembled device.

b) The production of the electrical conductor tracks is performed on one side of a thin polymer film. This must be suitable as an optical buffer layer, i.e. have low attenuation and a refractive index less than that of the optical waveguides (optical film thickness>>1/e drop of the optical fields). The film could, for example, consist of the same material from which daughter structures and covering structures are also produced. In the case of thicknesses in the μm range, this film is preferably first of all stabilized by a carrier film.

The bufferfilm is laminated with the electrical conductor tracks on to the cover plate, in order in this way to ensure a contacting of the electronic assemblies (after that, the rear carrier film can be pulled off).

The refractive index of the buffer film can then be raised again locally in the region of the diode windows by diffusion or implantation processes or by uv exposures (if there are correspondingly crosslinkable oligomers in the film) and consequently the coupling degree can be set. The various possibilities of lateral and vertical tapering are again available.

It is also possible, however, in an advantageous way for a thermoplastic film to be hot-embossed in the region of the diode windows by means of a correspondingly shaped embossing tool. This results in a layer thickness of the optical buffer which is defined by the embossing tools and is slightly thinner locally and ultimately results in a stronger field coupling in the desired regions. The field distributions are in turn comparable with the already mentioned qualitative variations.

Subsequently, the complete device is fitted exactly together, so that the photodiode windows come to lie exactly over the associated optical waveguides. The higher-refractive-index polymer in the optical waveguide grooves may in this case be formed as a thermally or UV-crosslinking adhesive and thus ensure the mechanical connection of the assemblies. At the same time, this liquid polymer compensates for any possible differences in thickness with respect to the cover plate, for example in the case of embossed buffer films. The buffer film may protrude with its applied conductral tracts laterally beyond the cover plate and permit simple electrical contacting to the outside.

It is furthermore in the spirit of the invention if an optical waveguide which has been produced, for example, by local photopolymerization, by so-called "UV bleaching" or by some other structuring technique in an organic polymer film is coupled onto the photodiode by an optically higher-refractive-index, transparent adhesive (for example UV-polymerizing adhesives). The said photodiode is located with its photosensitive side directly over the upwardly non-covered optical waveguide. The degree of optical coupling can be set by choice of the refractive index, the thickness and the surface area (length in the direction of the waveguide) of the polymer adhesive. Depending on the degree of coupling, the light can be coupled out of the optical waveguide (and in the loss-free limiting case coupled into the photodiode), or else be only slightly attenuated, in order for example to pick off signals from a data bus without influencing its optical transparency. A suitable coupling distance can be set by the shaping of the diode. The optical adhesive serves at the same time both for the optical coupling and for the mechanical fixing. The entire chip can be subsequently encapsulated and protected by a lower-refractive-index covering layer.

Examples of applications which may be mentioned are integrated-optical displacement/angle sensors or communication receiver stations, which thus can be assembled in an inexpensive way. In the case of a wavelength-selective detection, the signals would have to be filtered out here by wavelength-selective couplers or integrated-optical resonators on the optical chip and fed to the photoreceiver.

BRIEF DESCRIPTIONS OF THE DRAWINGS

The invention is to be explained in more detail below in exemplary embodiments with reference to the associated drawings, in which:

FIG. 1 perspectively shows the basic coupling of a photodiode;

FIG. 2 shows a section through the coupling location according to FIG. 1;

Figure 7:
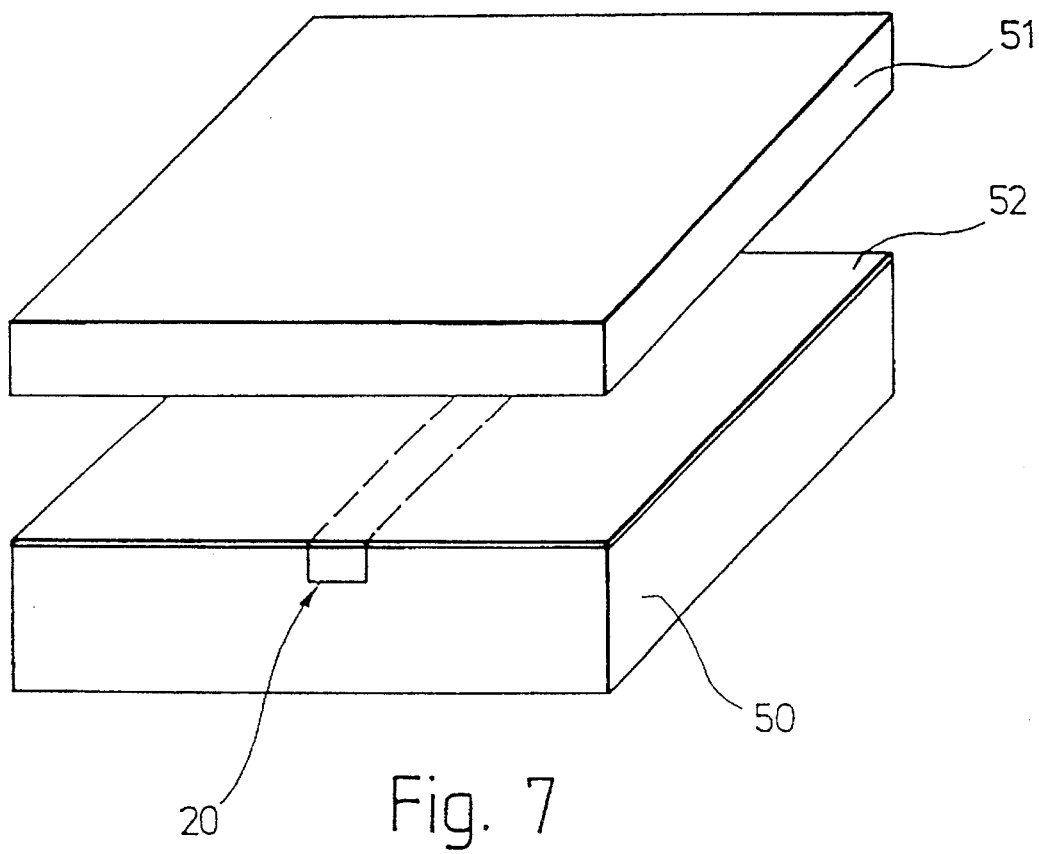
Figure 8:
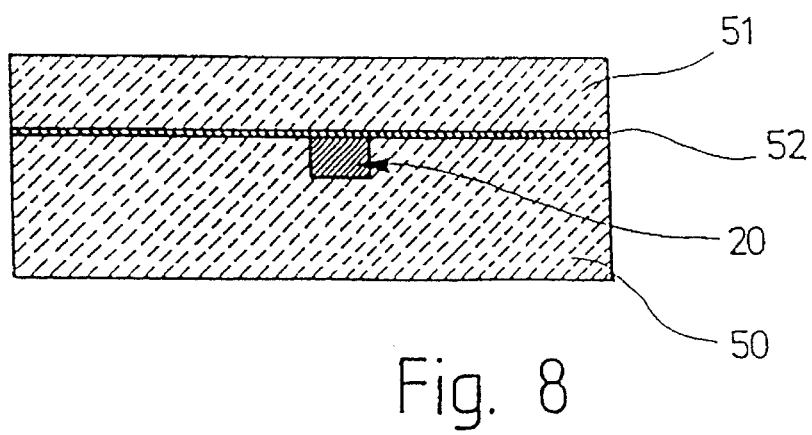
Figure 9:
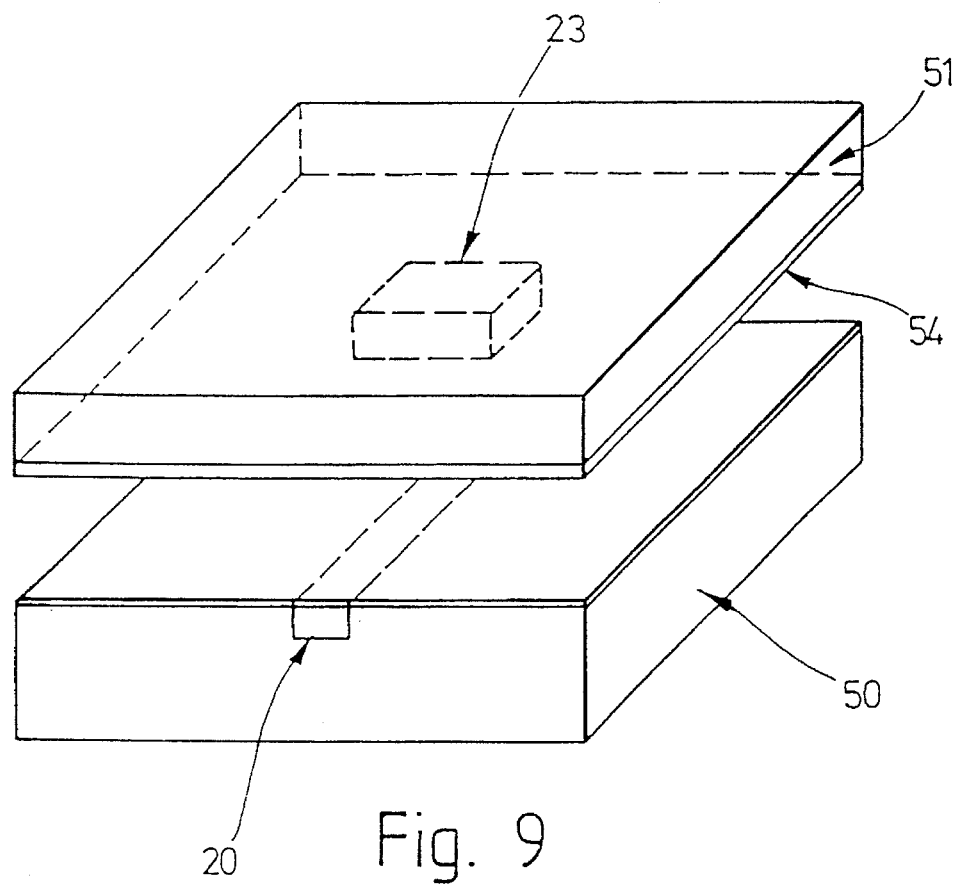
Figure 10:
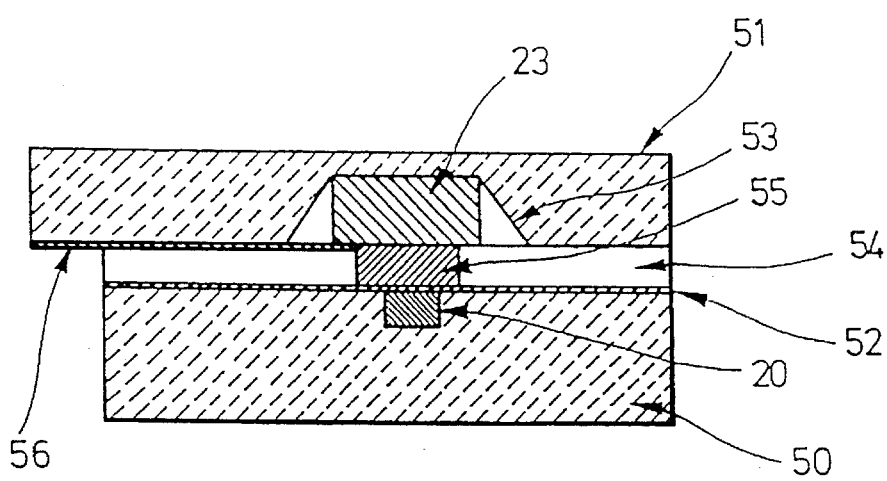
Figure 11:
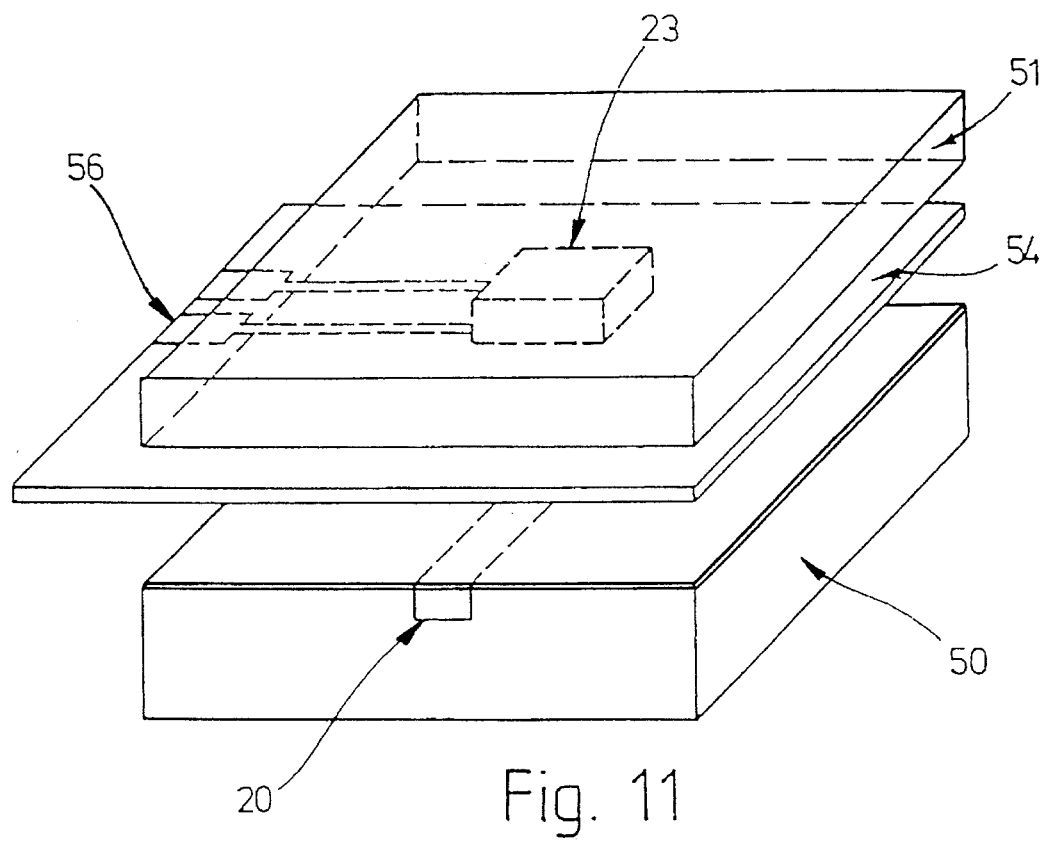
Figure 12:
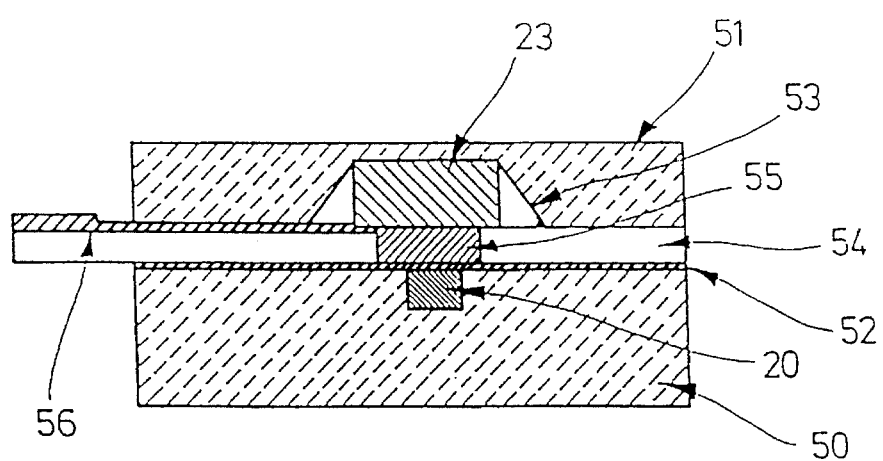
Figure 13:
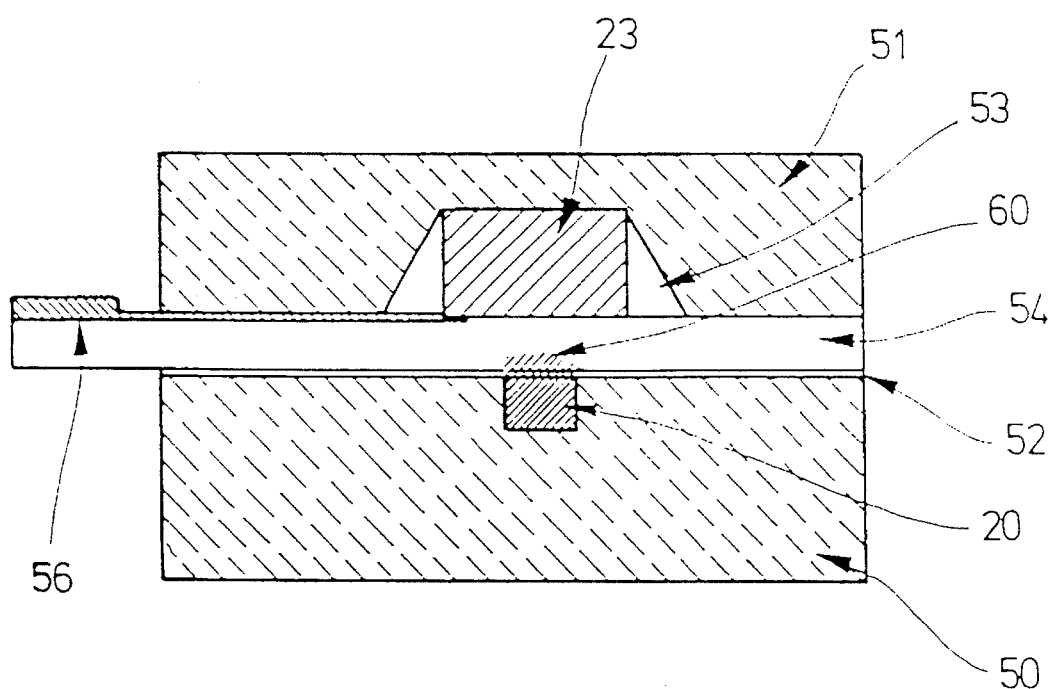
Figure 14:
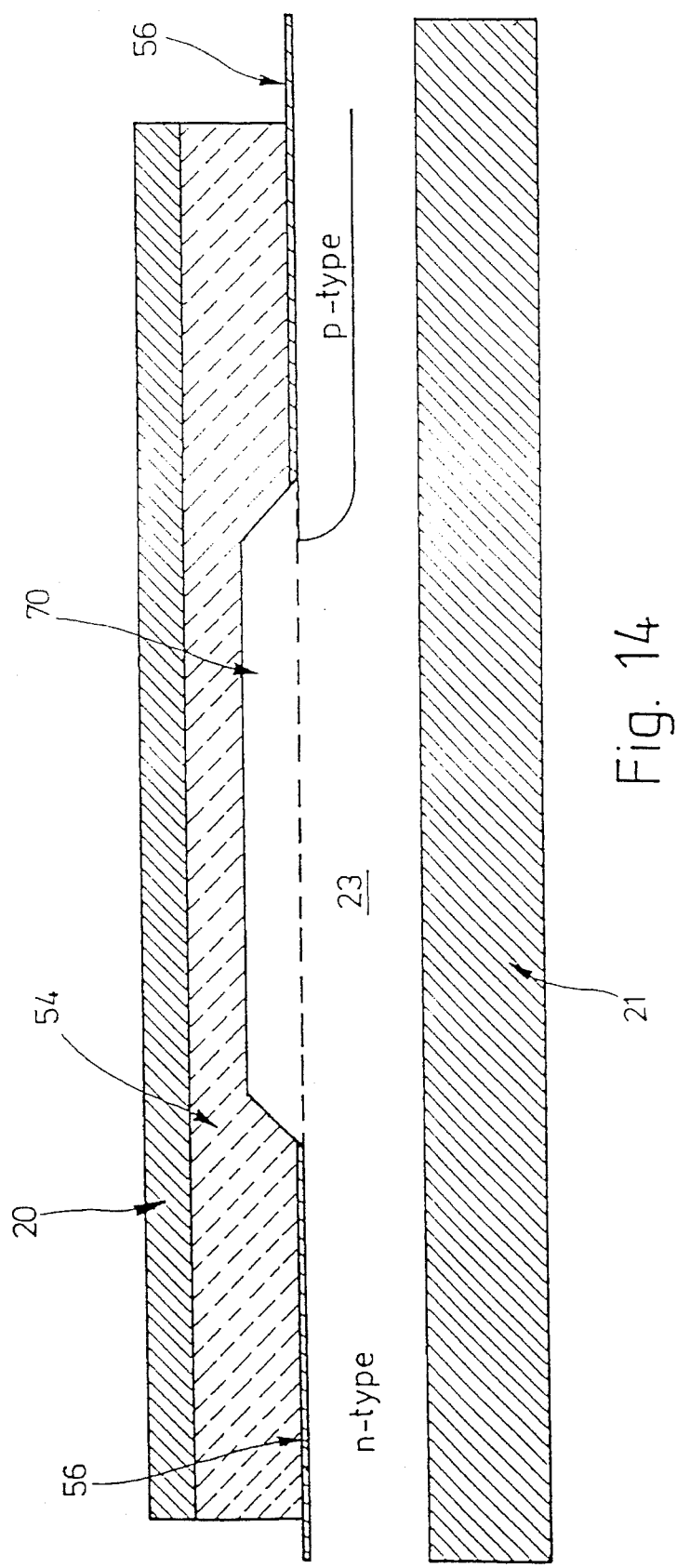

FIG. 7 perspectively shows a polymeric waveguide device before assembly;

FIG. 8 shows a section through the polymeric waveguide device according to FIG. 7 in the assembled state;

FIG. 9 perspectively shows a polymeric waveguide device with integrated photodiode before assembly;

FIG. 10 shows a section through the polymeric waveguide device according to FIG. 9 in the assembled state;

FIG. 11 perspectively shows a further polymeric waveguide device with integrated photodiode before assembly;

FIG. 12 shows a section through the polymeric waveguide device according to FIG. 11 in the assembled state;

FIG. 13 shows a section through a further polymeric waveguide device with integrated photodiode and FIG. 14 shows a section through a further polymeric waveguide device with integrated photodiode.

DETAILED DESCRIPTION OF THE PREFERRED EMBODIMENTS

In all the figures, the same parts, including parts which are the same by analogy, are denoted by the same reference numerals.

FIG. 1 shows an optical waveguide 20 which is arranged in a polymer film 22 provided on a substrate plate 21. A photodiode 23 is adhesively fixed onto the optical waveguide 20 by means of a polymer adhesive 24.

In FIG. 2 it becomes clearer that the photodiode 23 has a certain distance from the polymer film 22 and consequently from the optical waveguide 20. This distance is determined by the spacers 25. A buffer layer 26 is provided between substrate plate 21 and polymer film 22. The photodiode 23 is arranged with its photosensitive side directly over the optical waveguide 20. The entire device is encapsulated by a covering layer 27. The following relationships apply for the refractive indices of the individual component parts:

The refractive index $n_0$ of the covering layer 27 and the refractive index $n_4$ of the buffer layer 26 are less than or equal to the refractive index $n_3$ of the polymer film 22. The refractive index $n_1$ of the optical waveguide 20 is greater than $n_3$. The refractive index $n_2$ of the polymer adhesive 24 is less than or equal to the refractive index $n_1$ of the optical waveguide 20.

The mode of operation in principle is as follows:

A light pulse conducted through the optical waveguide 20 is coupled out of the optical waveguide 20, partially or completely depending on use, according to the set refractive index and also the thickness and length of the polymer adhesive 24, and is fed to the photodiode, which performs its predetermined function there. The spacers 25 may be metal surfaces which are applied to the photodiode 23 and increased to the desired thickness (=spacing), for example by electroplating, which at the same time serve as conductor tracks for passing on the signal to the photodiode 23.

Figure 3:
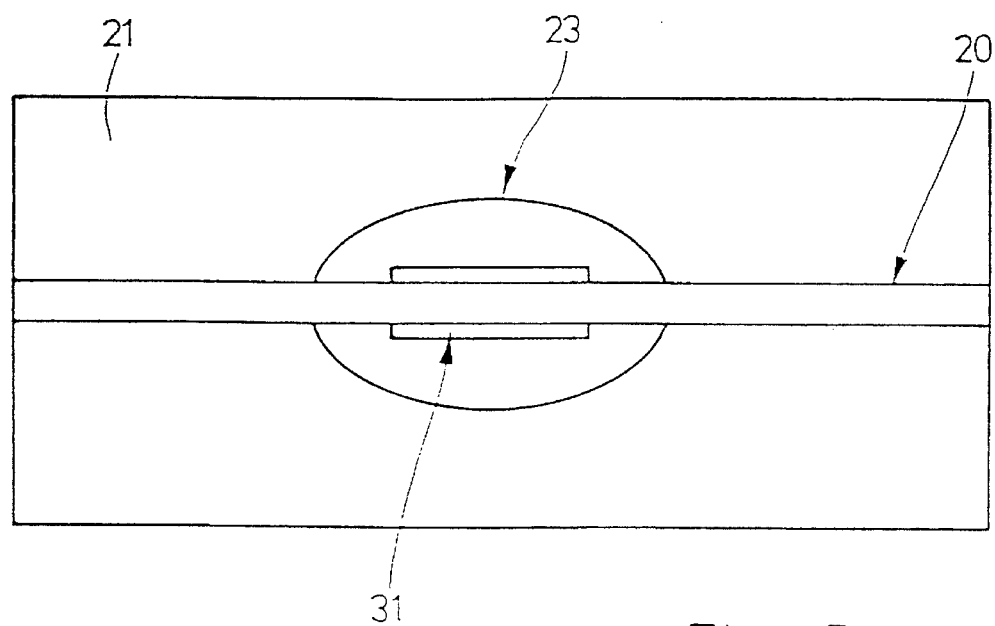
FIG. 3 shows a coupling location on a further example in plan view.
Figure 4:
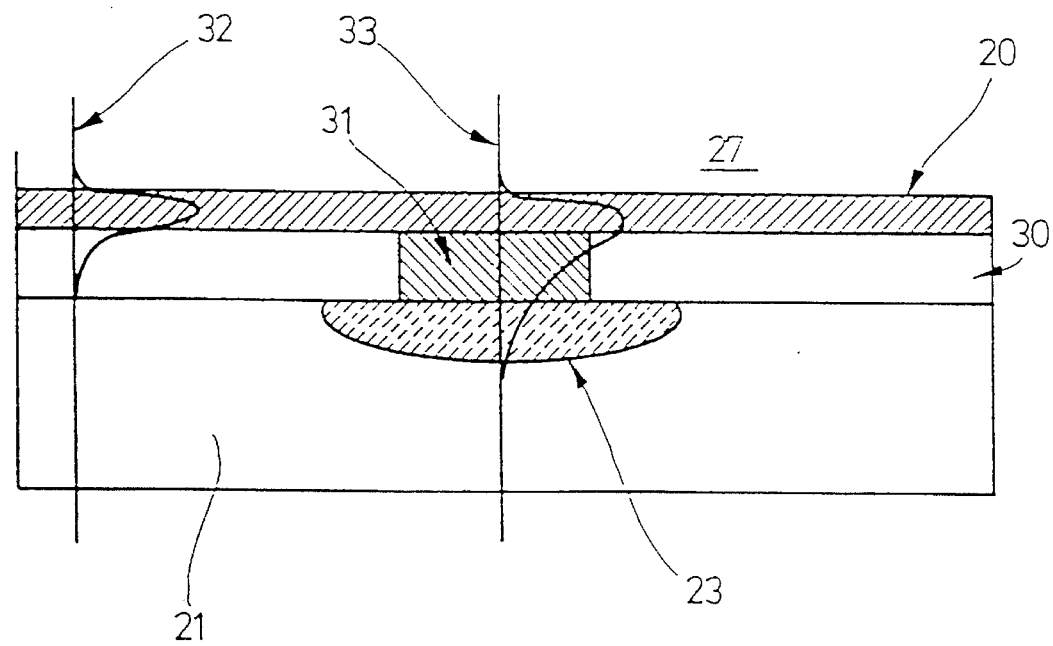
FIG. 4 shows a section through the coupling location according to FIG. 3.

The example shown in FIGS. 3 and 4 comprises a photodiode 23 which is integrated in a substrate plate 21 and over which the optical waveguide 20 runs, separated by a buffer layer 30. The buffer layer 30 has a region 31 which is arranged directly between the optical waveguide 20 and the photosensitive window of the photodiode 23.

The following relationships apply for the refractive indices:

The refractive index $n_0$ of the covering layer 27 is less than or equal to the refractive index $n_3$ of the buffer layer 30, which in turn is less than the refractive index $n_2$ of the region 31, which is less than the refractive index $n_1$ of the optical waveguide 20. In 32, the qualitative field distribution outside the region 31 is shown. The light pulse is guided within the optical waveguide 20. The qualitative field distribution in the region 31, here denoted by 33, makes it clear that, due to the higher refractive index of the buffer layer 30, the evanescent field components locally extend far beyond the buffer layer 30, and consequently into the photosensitive window of the photodiode 23. Consequently, the intended detection function of the photodiode 23 is initiated.

Figure 5:
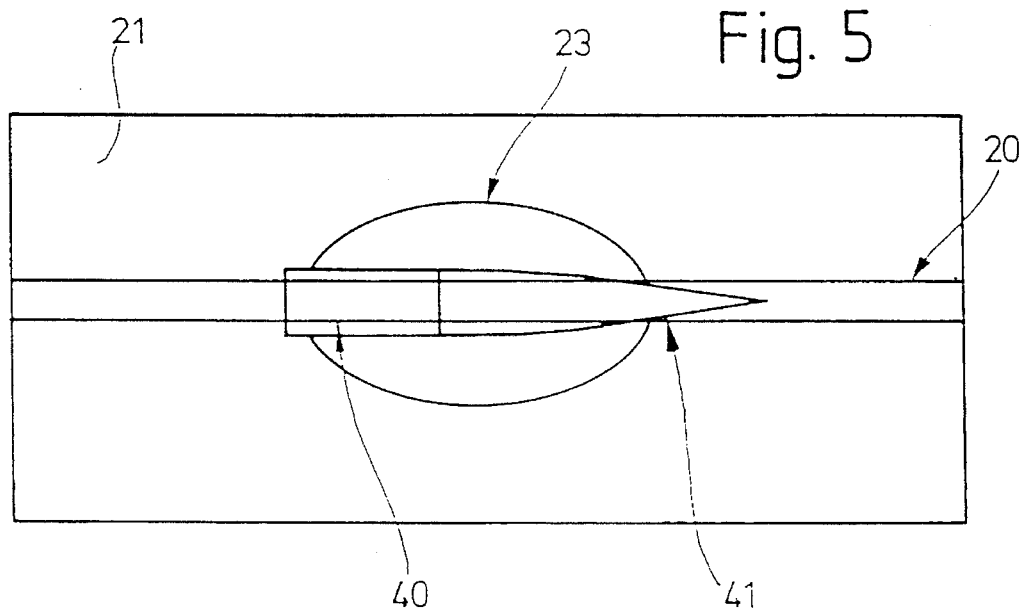
FIG. 5 shows a coupling location according to FIG. 3 with a tapered buffer region.
Figure 6:
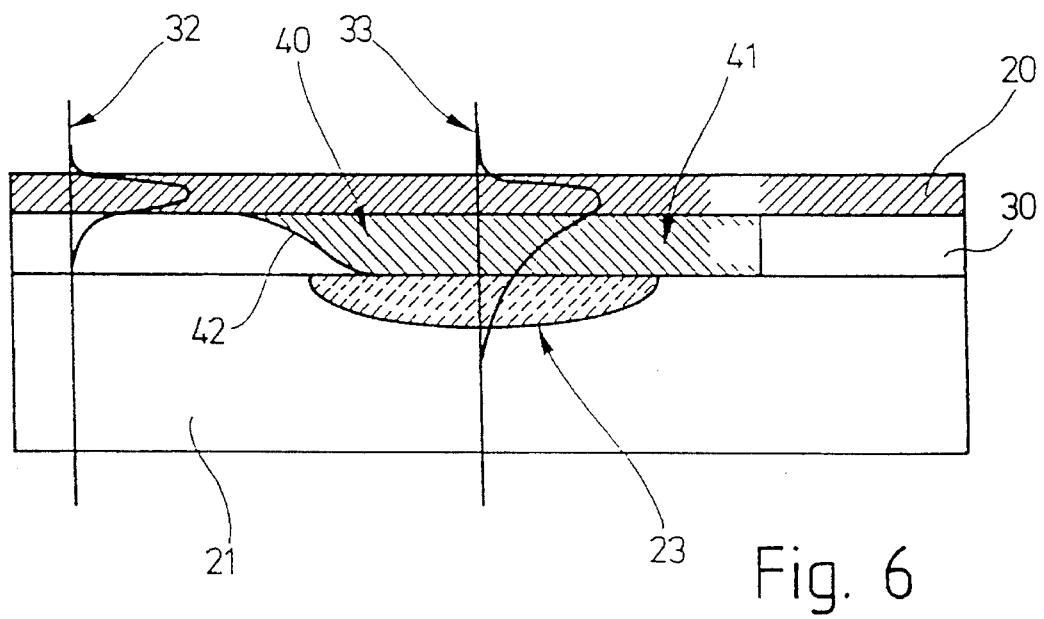
FIG. 6 shows a section through the coupling location according to FIG. 5.

In FIGS. 5 and 6 it is shown in a preferred exemplary embodiment with an analogous construction according to FIGS. 3 and 4 how the region 31 is tapered. On the left-hand side, a vertical taper is diagrammatically shown in 40 and on the right-hand side a lateral taper is diagrammatically shown in 41 (in actual devices, either the one or the other taper form is then used on both sides of the diode).

In the region 40, the taper has a slightly increased refractive index at the edges of the photodiode 23 and a more increased refractive index over the photosensitive window of the photodiode 23. The variation of the refractive index is indicated by the line 42. The taper may, however, also have a laterally pointed profile, as shown in the region 41. Here, the refractive index decreases in the lateral direction until the taper comes to a point outside the photodiode 23. Regarding the relationships between the refractive indices and the qualitative field distribution, the same applies as already stated with respect to FIGS. 3 and 4.

The further examples relate to solid-polymer devices produced by a forming technique.

The basic construction of solid-polymer devices is clearly illustrated in FIGS. 7 and 8. Higher refractive-index optical polymers, which form the optical waveguide 20, are cast in a base plate 50 of polymer substrate in precision-fabricated sizes. The base plate 50 is covered over by a cover plate 51, which may consist of the same polymer substrate as the base plate 50. The connection takes place by means of a liquid polymer 52, which may be identical to the polymer of the optical waveguide 20.

As shown in FIGS. 9 and 10, a photodiode 23 is inserted into a depression 53 of the cover plate 51. An optical buffer layer 54 is arranged between the base plate 50, or the adhesive 52, and the cover plate 51. The optical buffer layer 54 has a region 55 which allows a coupling between the optical waveguide 20 and the photodiode 23 only in this region. The region 55 may in turn be formed as already the region 31, described in FIGS. 3 to 6, that is to say without or with taper structures. The electrical connection tracks 56 of the photodiode 23 are led to the outside on the equipped cover plate 51.

The refractive indices of the individual regions behave analogously to those described in FIGS. 1 to 4, the refractive indices of substrate plate 50 and cover plate 51 being less than or equal to the refractive index of the buffer layer 54.

A light pulse coming through the optical waveguide 20 acts with its evanescent field components in the region of the photoactive window of the photodiode 23, and only here, through the buffer layer 54 and initiates in the photodiode 23 the desired switching function, which can be picked off via the connection tracks 56.

A further example is represented in FIGS. 11 and 12. The electrical connection tracks 56 of the photodiodes 23 are applied on a thin polymer film, which at the same time serves as optical buffer layer 54. Before assembly, the film is laminated with an exact fit onto the cover plate 51. All further component parts and functions have already been described in detail with respect to the other examples.

The example according to FIG. 13 has an optical buffer layer 54 in the form of a film, as described in FIGS. 11 and 12, which has been embossed in the region of the photoactive window. The embossing has been carried out in such a way as to obtain a region 60 which gives a locally defined slightly thinner layer thickness of the buffer layer 54. By the setting of this layer thickness, the coupling of the photodiode 23 onto the optical waveguide 20 is set in the manner already described.

In a further development, as shown in FIG. 14, apart from the described index manipulation of the buffer layer 54, which makes the latter "optically thinner" and consequently transmissive for the light waves, the light entry surface of the photodiode 23 can also be brought geometrically closer to the optical waveguide. For this purpose, the photodiode structure, in the example an InP-based technology is described without restricting generality, may be provided selectively over the light entry window with an InP covering layer 70 grown over it, which may typically be 0.2 to 1 µm thick. If a planarizing polymer buffer 54 is applied over such a diode structure and the optical waveguide 20 is applied thereover, the buffer action in the region of the diode entry window is distinctly reduced and, owing to the higher refractive index of the semiconductor materials (typically n>3.5), the evanescent light is drawn out of the optical waveguide and fed to the light-sensitive p/n junction of the semiconductor diode for detection.

This geometrical effect of the photodiode, which extends into the buffer layer, can be combined in the sense already described additionally with photopolymerized, tapered structures in the buffer layer.

I claim:

1. An Integrated-optical device in polymer technology, having a photoelement coupled onto an optical waveguide, with only the evanescent field components of the optical waveguide being coupled by an optical intermediate element into the photoelement, and wherein: the photoelement is incorporated into a polymeric upwardly closed cover plate; the cover plate is fitted exactly onto a base plate comprising a polymer layer having a light guiding optical waveguide; the intermediate element is an optical buffer layer disposed between the cover plate and the base plate; and the entire buffer layer has a lower refractive index than the lightguiding polymer layer.

2. An integrated-optical device according to claim 1, wherein the buffer layer is optically changed locally over a sensitive window of the photoelement such that the evanescent light fields extend locally far beyond the buffer layer and into the photoelement.

3. An integrated-optical device according to claim 1, wherein the refractive index of the buffer layer is raised, by local ion diffusion or ion implantation, in the region of a sensitive window of the photoelement.

4. An integrated-optical device according to claim 3, wherein the degree of optical coupling is set via the height of the index change of the buffer layer.

5. An integrated-optical device according to claim 1, wherein a polymer layer with photopolymerizable additives, the refractive index of which is set locally over a sensitive window of the photoelement by UV exposure, is used as the buffer layer.

6. An Integrated-optical device in polymer technology, having a photoelement coupled onto an optical waveguide, with only the evanescent field components of the optical waveguide being coupled by an optical intermediate element into the photoelement, and wherein: the photoelement is incorporated into a polymeric upwardly closed cover plate; the cover plate is fitted exactly onto a polymeric base plate having an optical waveguide; the intermediate element is an optical buffer layer disposed between the cover plate and base plate; the buffer layer is a polymer layer with photopolymerizable additives responsive to UV exposure and whose refractive index is set locally in a region opposite a sensitive window of the photoelement; the refractive index gradually changes spatially due to UV exposure, in varied density, such that the refractive index profile of the buffer layer is set in a longitudinal direction of the waveguide or as a spatial depth profile of a refractive index increase over the sensitive window of the photoelement.

7. An Integrated-optical device in polymer technology, having a photoelement coupled onto an optical waveguide, with only the evanescent field components of the optical waveguide being coupled by an optical intermediate element into the photoelement, and wherein: the photoelement is incorporated into a polymeric upwardly closed cover plate; the cover plate is fitted exactly onto a base plate comprising a polymer layer having a light guiding optical waveguide; the intermediate element is an optical buffer layer disposed between the cover plate and the base plate; and the buffer layer is structured in the lateral direction in a region opposite a sensitive window of the photoelement by a taper structure having a slightly increased refractive index.

8. An integrated-optical device according to claim 7, wherein the taper structure runs to a point.

9. An integrated-optical device according to claim 1, wherein the optical buffer layer allows an optical coupling with the optical waveguide only in a region of a sensitive window of the photoelement.

10. An integrated-optical device according to claim 1, wherein the optical waveguides comprise higher-refractive-index polymers incorporated in structures formed as grooves in the polymeric base plate.

11. An Integrated-optical device in polymer technology, having a photoelement coupled onto an optical waveguide, with only the evanescent field components of the optical waveguide being coupled by an optical intermediate element into the photoelement, and wherein: the photoelement is incorporated into a polymeric upwardly closed cover plate; the cover plate is fitted exactly onto a base plate comprising a polymer layer having a light guiding optical waveguide; the intermediate element is an optical buffer layer disposed between the cover plate and the base plate; the optical buffer layer, with photopolymerizable admixtures, is applied to the cover plate; and the refractive index of the buffer layer in a region opposite a sensitive window of the photoelement is raised and set in at least one of the longitudinal direction of the waveguide, as a spatial depth profile of the refractive index increase, and as a taper structure by local UV exposure.

12. An Integrated-optical device in polymer technology, having a photoelement coupled onto an optical waveguide, with only the evanescent field components of the optical waveguide being coupled by an optical intermediate element into the photoelement, and wherein: the photoelement is incorporated into a polymeric upwardly closed cover plate; the cover plate is fitted exactly onto a base plate comprising a polymer layer having a light guiding optical waveguide; the intermediate element is an optical buffer layer disposed between the cover plate and the base plate; and the optical buffer layer is formed as a thin polymer film having electrical conductor tracks on a side facing the cover plate; and this buffer film with the electrical conductor tracks is laminated onto the cover plate such that the photoelements are electrically contacted at the same time.

13. An integrated-optical device according to claim 12, wherein the refractive index of the buffer film is raised locally in the region opposite a sensitive window of the photoelement.

14. An integrated-optical device according to claim 12, wherein the degree of optical coupling is set via the refractive index.

15. An integrated-optical device according to claim 13, wherein the refractive index of the buffer layer has different magnitudes in at least one of laterally and vertically.

16. An integrated-optical device according to claim 12, wherein the optical buffer layer comprises an embossed thermoplastic film.

17. An integrated-optical device according to claim 12, wherein the optical buffer layer has a smaller layer thickness locally in a region opposite a sensitive window of the photoelement.

18. An integrated-optical device according to claim 12, wherein the optical buffer layer carrying the electrical conductor tracks extends beyond the outer dimensions of at least one of the cover and base plates and has electrical contacts there.

19. An Integrated-optical device in polymer technology, having a photoelement coupled onto an optical waveguide, with only the evanescent field components of the optical waveguide being coupled by an optical intermediate element into the photoelement, and wherein: the photoelement is incorporated into a polymeric upwardly closed cover plate; the cover plate is fitted exactly onto a base plate comprising a polymer layer having a light guiding optical waveguide; the intermediate element is an optical buffer layer disposed between the cover plate and the base plate; and a light entry surface of the photoelement is geometrically closer to the optical waveguide than the cover plate and extends partially into the buffer layer.

20. An integrated-optical device according to claim 19, wherein the light entry surface is covered by a semiconductor layer which has a higher refractive index than the optical waveguide, and draws the evanescent light fields out of the optical waveguide and feeds them to a light-sensitive junction of the semiconductor layer for detection.

21. An Integrated-optical device in polymer technology, having a photoelement coupled onto an optical waveguide, with only the evanescent field components of the optical waveguide being coupled by an optical intermediate element into the photoelement, and wherein: the photoelement is incorporated into a polymeric upwardly closed cover plate; the cover plate is fitted exactly onto a base plate comprising a polymer layer having a light guiding optical waveguide; the intermediate element is an optical buffer layer disposed between the cover plate and the base plate; and the optical waveguide is produced in a base plate formed of organic polymer film; and the photosensitive side of the photoelement is adhesively attached by a higher-refractive-index transparent adhesive, which forms the buffer layer, directly onto the optical waveguide.

22. An integrated-optical device according to claim 21, wherein-the degree of optical coupling is set by choice of the refractive index, the thickness and the length of the polymer adhesive.

23. An Integrated-optical device in polymer technology, having a photoelement coupled onto an optical waveguide, with only the evanescent field components of the optical waveguide being coupled by an optical intermediate element into the photoelement, and wherein: the photoelement is incorporated into a polymeric upwardly closed cover plate; the cover plate is fitted exactly onto a base plate comprising a polymer layer having a light guiding optical waveguide; the intermediate element is an optical buffer layer disposed between the cover plate and the base plate; and the coupling distance is set via spacers arranged between the polymer base plate receiving the optical waveguide and the photoelement.

24. An integrated-optical device according to claim 23 wherein the spacers are formed by conductor tracks thickened by electroplating, applied to the photoelement.

25. An integrated-optical device according to claim 21, wherein the adhesive at the coupling location simultaneously serves to mechanically fix the photoelement to the base plate and waveguide.

26. An Integrated-optical device in polymer technology, having a photoelement coupled onto an optical waveguide, with only the evanescent field components of the optical waveguide being coupled by an optical intermediate element into the photoelement, and wherein: the photoelement is incorporated into a polymeric upwardly closed cover plate; the cover plate is fitted exactly onto a base plate comprising a polymer layer having a light guiding optical waveguide; the intermediate element is an optical buffer layer disposed between the cover plate and the base plate; and the optical waveguide is encapsulated together with the coupled-on photoelement by a lower-refractive-index covering layer.

27. An integrated-optical device according to claim 26 wherein the buffer layer has a refractive index in a region opposite the photoelement which is less than or equal to the refractive index of the buffer layer outside the region opposite the photoelement.

28. An integrated-optical device according to claim 1 wherein the buffer layer has a refractive index in a region opposite the photoelement which is less than or equal to the refractive index of the buffer layer outside the region opposite the photoelement.

29. An integrated-optical device according to claim 21, wherein the coupling distance is set via spacers arranged between the polymer base plate receiving the optical waveguide and the photoelement.

* * * * *